Feb. 28, 1961 R. S. LANIER 2,972,914
MULTIPLE SPINDLE BORING MACHINE
Filed Nov. 10, 1957 2 Sheets-Sheet 1

INVENTORS
Reginald S. Lanier
BY
Williamson, Schroeder, Adams & Meyers
ATTORNEYS

Feb. 28, 1961

R. S. LANIER 2,972,914

MULTIPLE SPINDLE BORING MACHINE

Filed Nov. 10, 1957

INVENTORS
Reginald S. Lanier
BY
Williamson, Schroeder, Adams & Meyers
ATTORNEYS

United States Patent Office 2,972,914
Patented Feb. 28, 1961

2,972,914
MULTIPLE SPINDLE BORING MACHINE

Reginald S. Lanier, Wayzata, Minn., assignor to Washington Machine & Tool Works, Inc., Minneapolis, Minn., a corporation of Minnesota Filed Oct. 10, 1957, Ser. No. 689,300

2 Claims. (Cl. 77—22)

This invention relates to boring machines and more particularly relates to a boring machine for producing a multiplicity of bore holes in a workpiece.

Because of the high degree of accuracy with which bore holes must be produced, it has been the common practice in the trade to produce in a workpiece, bore holes one at a time. This necssitates repositioning and affixing the workpiece after each bore hole is produced. It should be recognized that the accuracy with which bore holes are produced is in relation to the size of the bore hole and the positioning thereof. Obviously if a large number of bore holes are to be produced in a workpiece, it is extremely expensive to produce these bore holes one at a time. This is so particularly if a large number of parts are to be made for machines in production.

An object of my invention is to provide a new and improved boring machine of relatively simple and relatively inexpensive construction and operation whereby a multiplicity of bore holes may be simultaneously produced.

Another object of my invention is the provision in a boring machine of a multiple spindle head having a novel spindle driving mechanism for simultaneously driving a multiplicity of bore bar-carrying spindles.

A further object of my invention is the provision in a boring machine of a simple, but novel head construction which offsets any effect of temperature variation in the workpiece or room temperature so as to maintain the spindle-mounting head and the workpiece at substantially identical temperatures and thereby eliminate any inaccuracies in tolerances due to temperature variations between the head and workpiece.

A still further object of my invention is the provision in a multiple spindle boring machine of a new and novel head construction employing readily insertable and removable spindle-mounting cartridges which are easily replaceable to facilitate ready and easy servicing of the boring machine.

These and other objects and advantages of my invention will more fully appear from the following description made in connection with the accompanying drawings wherein like reference characters refer to the same or similar parts throughout the several views and in which.

Figure 1:
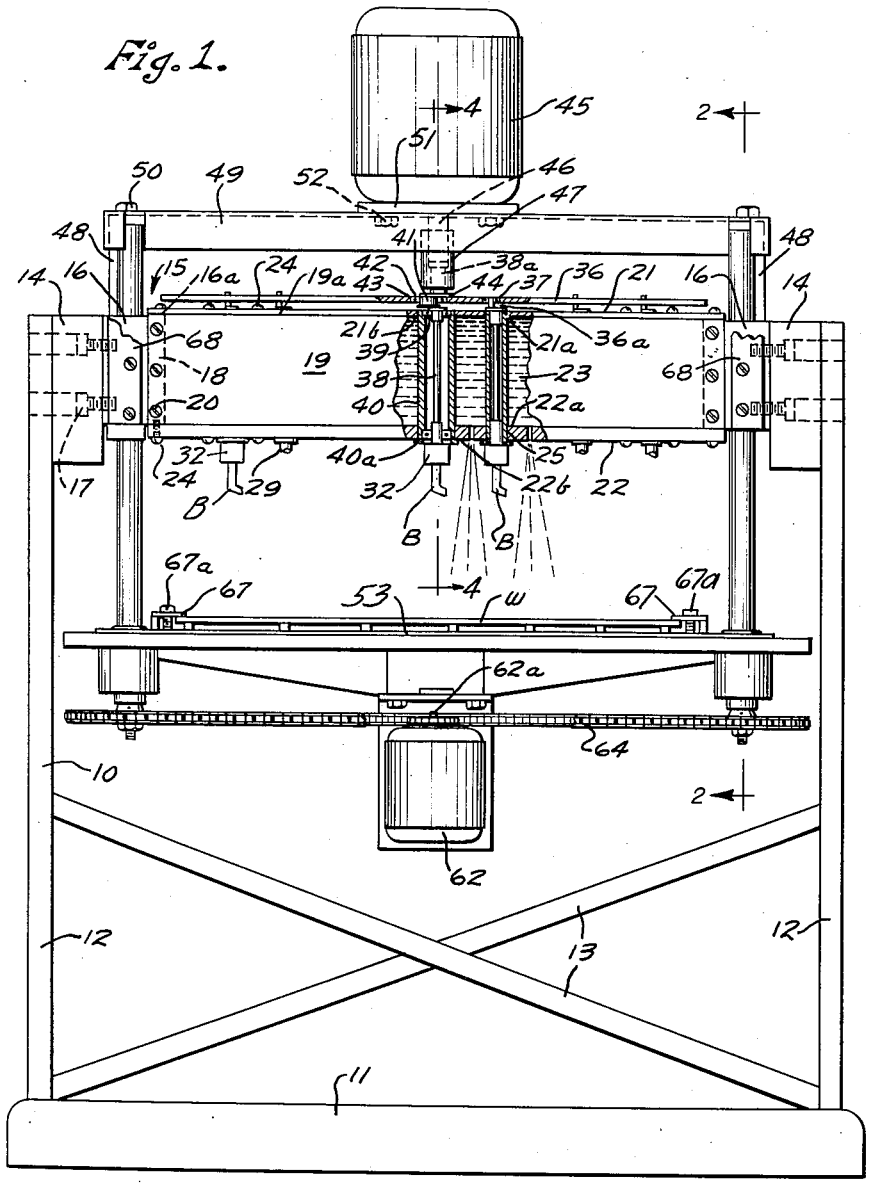
Fig. 1 is a front elevation view of the boring machine, and having a portion of the head broken away.
Figure 3:
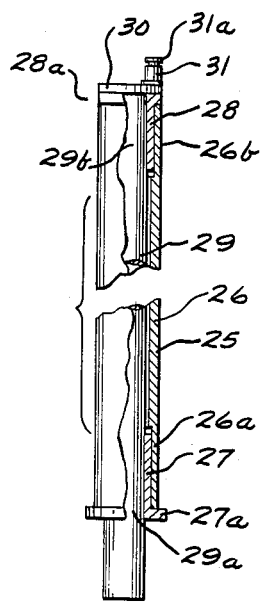
Fig. 3 is an enlarged detail elevation view, partly broken away of one of the boring bar spindles and the removable spindle-mounting cartridge therefor.

One form of the present invention is shown in the accompanying figures and is described herein. The boring machine includes a supporting structure which is indicated in general by numeral 10 and which includes a base 11 and a pair of spaced upright standards or frame members 12 and crossed braces 13 affixed as by welding to the upright frame members 12, and mounting blocks 14 affixed as by welding on the inner sides of the frame members 12 at their upper ends.

The boring machine includes a stationary head indicated in general by the numeral 15 which is affixed to the supporting structure 10. A pair of end members or blocks 16 are respectively affixed to the opposite blocks 14 as by screws 17 which are threaded thereinto and which are carried by the blocks 14. The inner sides of the end members 16 are inwardly reduced in thickness to define shoulder surfaces 18 against which the front and rear upright sidewalls 19 are mounted. The sidewalls 19 are affixed to the end members 16 in any suitable manner such as screws 20. The head 15 also includes upper and lower spindle-mounting portions or plates 21 and 22 which cooperatively define therebetween, along with the side members 19 and end members 16, a tempering liquid-confining chamber 23 in the head 15. The upper and lower plates 21 and 22 are constructed of material which is preferably identical to the material from which the workpiece W is constructed, and are secured to the end members 16 and side members 19 in such a manner as to be readily replaceable when the machine is being set up to produce bores in a workpiece of different design or different material, and in the form shown, the upper and lower plates 21 overlie the upper edge portions 19a and 16a of the side members 19 and end members 16 respectively and are removably secured thereto as by screws 24. The upper and lower mounting plates 21 and 22 have a plurality of aligned apertures 21a and 22a therein. The apertures 21a and 22a are arranged in the plates 21 and 22 in the exact arrangement of the bores to be produced in the workpiece W and are bored with precision as to size and location. Each pair of aligned apertures 21a and 22a has a spindle-mounting cartridge 25 projecting therethrough so as to be mounted on the head. The cartridge 25 includes a rigid tubular member 26 which is identical in size and configuration to that of the apertures 21a and 22a so as to extend through the apertures in a close tolerance, liquid-sealing fit. However, it is specifically pointed out that the tubular member 26 is longitudinally slidable in the apertures 21a and 22a for retraction from the head 15 so as to facilitate ready and easy replacement of the cartridge 25. A pair of internal, sleeve bearings 27 and 28 are mounted in a sweat fit in the internally enlarged end portions 26a and 26b of the tubular member 26 for journalling the boring bar mounting spindle 29 therein. The bearings 27 and 28 are constructed of somewhat porous, synthetically fabricated metallic material which is impregnated with lubricant so as to preclude the need for additional lubrication of the spindle 29 therein. In the form shown, the bearings 27 and 28 are constructed of a material known by the trademark "Oilite," a product of Chrysler Corporation, Amplex Division, whose home office is located at 6501 Harper, Detroit 31, Michigan. Of course the internal peripheries of the bearings 27 and 28 are precision finished. It will also be noted that the bearings 27 and 28 are flanged at their outer ends 27a and 28a to bear against the ends of tubular member 26. The flanged portion 28a of bearing 28 is of the identical size and configuration as the external periphery of tubular member 26 so as to be adapted to slide through the apertures 22a and 21a of the mounting plates 22 and 21 respectively. The flanged portion 27a is substantially larger than the external periphery of the tubular member 26 so as to engage and rest upon the lower surface of the lower plate 22 and thereby restrict upward movement of the cartridge 25 and spindle 29 through the head.

The end portions 29a and 29b of spindle 29 are precision ground so as to provide a close tolerance fit with the internal periphery of the bearings 27 and 28 respectively. It should be understood that the spindle 29 is also readily retractable from the spindle-mounting cartridge 25 in an upward direction. Spindle 29 has a flange 30 formed integrally thereof on the upper end thereof for engaging and bearing against the end of bearing 28 and restraining downward movement of the spindle 29. The spindle 29 also has a cylindrical lug or connecting element 31 affixed on the upper end thereof in eccentric relation to the rotation axis of the spindle. Lug 31 has an annular groove 31a therein for receiving a retainer ring or E-ring therein for purposes hereinafter described.

The lower end 29a of spindle 29 is adapted for mounting a boring bar B thereon and as seen in Fig. 1 a sleeve-type coupling 32 employing set screws may be utilized for removably securing the boring bar B on the lower end of the spindle. The flanges 27a of bearings 27 engage couplings 32 to carry the end thrust when the boring bars B engage the workpiece. It will be understood that spindles 29 are journalled in the head in each location corresponding to the location of a bore hole to be produced in the workpiece W.

Means are provided for supplying a tempering liquid to the chamber 23 and head 15 and circulating the liquid therethrough. In the form shown, such means include a pair of nipples 33 which extend through one of the sidewalls 19 and are threadably or otherwise affixed therein, and hoses 34 which are connected to the nipples 33 and which are also connected to a recirculating source (not shown) of supply of the liquid. The source of supply may include means for maintaining the tempering liquid at a predetermined temperature. This is particularly important if the plates 21 and 22 are constructed of material different from the material of the workpiece. Such liquid circulating means also includes a plurality of apertures 35 in the lower spindle-mounting plate 22 for discharging quantities of the liquid from the chamber 23 downwardly onto the workpiece W in proximity with the points of engagement between the boring bars and the workpiece so as to maintain the workpiece W at the identical temperature of the plates 21 and 22 and the spindles 29 and cartridge assemblies 25. The tempering liquid discharged through the apertures 35 may be collected and recirculated to the source by means hereinafter described.

Means are provided for producing simultaneous rotation of each of the spindles 29 and in the form shown, such means include a rigid wobble plate 36 which has a plurality of apertures 36a therein which are arranged in an identical manner to the arrangement of the bore holes to be produced in the workpiece and identical to the arrangement of the apertures 21a and 22a in the plates 21 and 22, a ball bearing 37 is mounted in each of the apertures 36a and is connected with a respective lug 31 on one of the spindles 29. The wobble plate 36 is retained on the lugs 31 by a plurality of E-rings (not shown) which grip the lugs 31 in the grooves 31a. It will therefore be seen that the spindles 29 will be simultaneously rotated as the wobble plate 36 is moved in a gyratory movement.

A plate-driving member or shaft 38 is journalled in the head 15 and adapted for connection with the drive element with a source of rotary power. The shaft 38 is journalled by ball bearing 39 in the opposite ends of a sleeve 40 which projects through apertures 21b and 22b of mounting plates 21 and 22 in a close tolerance, liquid-sealing fit. The lower end of sleeve 40 is flanged at 40a for engaging the lower surface of plate 22 and restricting upward movement of the sleeve in the head. It should be pointed out that the sleeve 40, although fitting closely in the apertures of the mounting plates 21 and 22 is longitudinally and slidably retractable from the head in a downward direction. The upper and lower ends of the shaft 38 are precision ground similarly to the spindles 29 so as to produce true circular rotation about the shaft axis. The lower end of the shaft 38 is also adapted for mounting a boring bar B thereon as by a sleeve 32 in a manner identical to the mounting of the bar B on one of the spindles 29.

Shaft 38 has a cylindrical camming portion 41 formed integrally thereof and in eccentric relation with respect to the rotation axis. The eccentric camming portion 41 is fitted onto a bearing 42 which is in an aperture 43 located at the geometric center of the wobble plate 36. The upper terminal end portion 38a of shaft 38 is coaxial with the lower portion of the shaft and is adapted for connection with a source of rotary power. Means are provided for dynamically balancing the wobble plate 36 together with the eccentric camming portion 41 of shaft 38 and in the form shown, such means include a counterweight 44 affixed on the camming portion 41 as by a screw.

The source of rotary power for driving the shaft 38 comprises an electric motor 45 having a rotary drive element or spindle 46 disposed in substantial alignment with the upper end portion 38a of the shaft 38. A readily removable flexible coupling 47 of any conventionally known type is provided for interconnecting the spindle 46 and the upper end 38a of shaft 38. Flexible coupling 47 may be keyed to the shafts so as to directly transmit the rotary movement of shaft 46 to shaft 38.

Means are provided for supporting the motor 45 and spindle 46 in fixed relation with the head 15 and to provide for the ready and easy removal of the motor 45 so as to facilitate disassembly of the spindle-mounting plates 21 and 22 and the spindle-mounting cartridges 25 therefrom. Such means includes a plurality of rigid tubular posts 48 supported on the end members 16 of the head. A downwardly opening channel member 49 has its opposite ends supported on the posts 48, and the ends of channel 49, and posts 48, are affixed to the end members 16 of the head by elongated bolts 50 which project downwardly through suitable apertures in the channel 49 and through the tubular posts 48 and are threadably received in the end members 16. The motor 45 is carried on machined plate 51 on the upper side of channel 49 and is affixed to the channel 49 as by bolts 52 which extend upwardly through the channel 49 and plate 51 and are threaded into the frame of the motor 45.

A workpiece-supporting table 53 is provided for carrying the workpiece W beneath the head 15. The workpiece-supporting table 53 is provided with means for producing vertical movement thereof and guiding the same in vertical movement. In the form shown, the table 53 is generally rectangular in shape and is provided with a plurality of rigid upstanding guide posts 54 at the several corners thereof. The lower end of posts 54 extend through openings 55 in the workpiece-supporting table 53 and are affixed therein as by a suitable retainer 54a and a ring 54b on the lower and upper sides of table 53 respectively. The upper portion of posts 54 extends through openings 56 in the end members 16, and are guided for sliding movement therein as by bearings 57 of any suitable type. Of course a seal 58 and a retainer cap 59 may be provided at the outer ends of each of these bearings. The cap 59 may be threaded to the bearing.

A plurality of screws 60 are journalled in the table 53 and extend through openings 53a therein. Oilite bushings 54b are provided in the openings 53a for mounting the rotary screw 60. A thrust bearing 61 is mounted on the lower end portion of screw 60 and bears against the bottom surface of the table 53. Each of the screws 60 are drivably connected at their lower ends to a second source of rotary power comprising a motor 62 which is carried on a bracket 63 which is affixed to the lower surface of table 53 and disposed substantially centrally thereof. The rotary drive shaft 62a of motor 62 has a sprocket (not shown) thereon and is drivably connected by means of roller chain 64 to sprockets 65 which are keyed on the lower ends of screws 60 and are secured thereon as by nuts 66.

Of course the table 53 is provided with suitable clamping means for holding the workpiece W in a predetermined position thereon and such clamping means may take any suitable form such as the clamping bar 67 affixed to the table as by bolts 67a.

Figure 2:
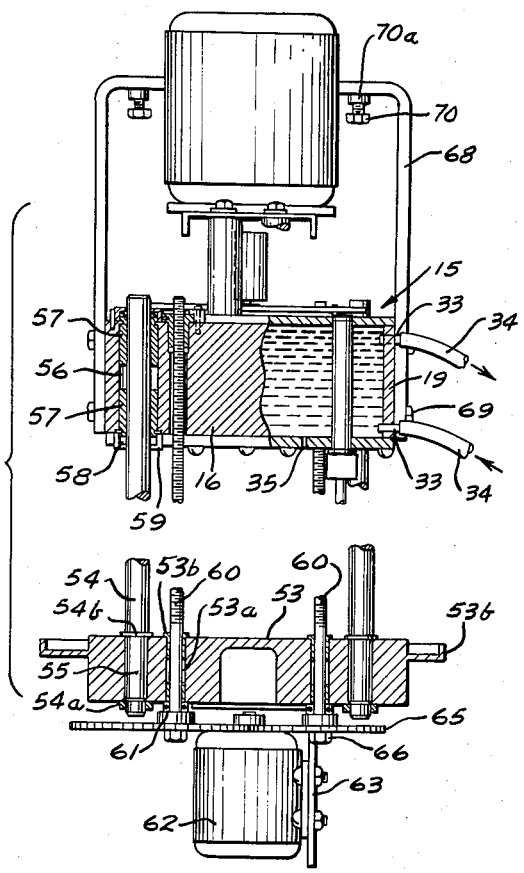
Fig. 2 is a section view taken on a vertical plane substantially at 2—2 in Fig. 1 and having a portion of the head broken away to show the interior.
Figure 4:
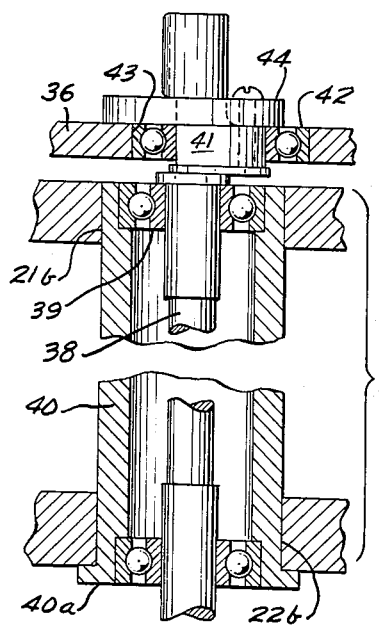
Fig. 4 is an enlarged detail elevation view of the eccentric cam drive for the wobble plate.

As best seen in Fig. 2, the table 53 is provided with a trough 53b around the periphery thereof for collecting the tempering liquid which is discharged onto the workpiece W from the apertures 35 in the head. The trough 53b may be connected as by a hose to the recirculating source of tempering liquid.

At each end of the head 15 a pair of inverted U-shaped frame members 68 have their opposite end portions affixed as by bolts 69 to the front and rear sides of the end member 16. The frame members 68 have adjustable stops 70 at the upper ends thereof in vertical alignment with the top of post 54 for engaging the posts 54 and limiting the vertical movement of the work table 53. In the form shown the stops 70 comprise bolts which are threaded into the frame member 68 and are locked into position as by nuts 70a.

In the use of the boring machine, the arrangement of the bore holes to be produced in the workpiece W must of course be carefully laid out. The spindle-mounting plates 21 and 22 are then formed and the apertures 21a and 22a are formed in these plates in the precise arrangement of the bore holes to be produced in the workpiece W. In a similar fashion, the apertures 36a are formed in the wobble plate 36 in the precise arrangement of the bore holes to be produced in the workpiece.

The machine must then be in part dismantled from the upper end of shaft 38 and then the frame member 49 and motor 45 are dismantled. The wobble plate 36 must be removed from the spindle lugs 31 and then the several spindle-mounting cartridges 25 are removed from the plates 21 and 22 by sliding them downwardly therefrom, after the boring bars B and connecting sleeves 32 have been removed from the spindles. The plate-driving shaft 38 and the mounting sleeve 40 will be removed downwardly through the head. The mounting plates 21 and 22 may then be readily and easily removed from the end members 16 and the front and rear side members 19 by merely removing the securing screws. Subsequently the newly formed mounting plates 21 and 22 will be applied onto the upper and lower portions of the head and affixed thereto by the screws. The spindle-mounting cartridges and the sleeve 40 will be inserted into the corresponding apertures of the plates 21 and 22 and of course the spindles and plate-driving shaft are assembled therewith. The newly formed wobble plate 36 is then applied to the lugs 31 of the spindles and to the eccentric camming portion 41 of the plate-driving shaft 38. Of course the counterweight is affixed. In this condition, the spindles, plate-driving shaft, and wobble plate are all carried by the head in dynamically balanced condition so that when the shaft 38 is revolved, there will be substantially no vibration at the boring bars B. The channel 49 and motor 45 may then be quickly applied to the machine and affixed thereon and when the flexible coupling 47 is secured to the shaft 38, the boring machine is prepared for a new run of producing the boring holes in the workpiece W. Because the wobble plate 36 is directly coupled by means of the plate-driving shaft 38 to the head, precision alignment of the spindle 46 of motor 45 with the upper end of shaft 38 is unnecessary. It will therefore be seen that the conversion of the boring machine from one run of workpieces to another run of workpieces wherein the holes to be bored are differently arranged, may be readily and easily accomplished. It has been experienced that the bore holes produced in the workpiece are as accurately sized and located by the use of this multiple spindle-boring machine as in any previous commonly known method of producing boring holes one at a time. It will be understood that as compared to any previously other known method of producing boring holes, an extremely large saving can be made in the cost of producing bore holes in workpieces, particularly where a large number of such workpieces are to be formed. One example of the workpieces to be formed are end frame members of high speed computers, wherein a multiplicity of bore holes must be accurately produced in each member.

The machine provides the added advantage of moving the workpiece toward the boring bars. In the precision boring machine, the workpiece-supporting table and associated structure for moving the table is, of course, substantially simpler than the head mechanism and inaccuracies as to the position of the bore holes are precluded by moving the workpiece to the stationary boring bars instead of vice versa.

It will, of course, be understood that various changes may be made in the form, detail, arrangement and proportion of the parts without departing from the scope of the invention which consists of the matter described herein and set forth in the appended claims.

What is claimed is:

1. A boring machine for producing bore holes in a workpiece constructed of a certain material, said machine comprising a supporting structure, a head on the supporting structure defining a tempering liquid-confining chamber, said head having spaced, readily replaceable upper and lower portions defining walls of the chamber and being constructed of material identical to the material from which the workpiece is constructed, means for circulating tempering liquid through the chamber, said upper and lower portions of the head having a plurality of aligned apertures therein, a plurality of boring bar mounting spindles, a plurality of tubular spindle-mountings each projecting through aligned apertures in the upper and lower portions of the head in a substantially sealing close tolerance fit and said tubular mountings being longitudinally rearactable from the head, said spindle mountings having internal rotary bearing means and receiving said spindles therethrough, the lower ends of the spindles being adapted for mounting boring bars thereon, mechanism carried by the supporting structure for rotating the spindles on their respective axes, a workpiece-supporting table below the head, mechanism movably connecting the table and the head and producing vertical movement of the table whereby to produce engagement between the boring bars and workpiece, and means directing the tempering liquid onto the workpiece to maintain the workpiece, spindles, and head at substantially identical temperatures, whereby the upper and lower portions of the head are readily replaceable when a workpiece of different design or different material is to be bored.

2. A boring machine for producing bore holes in a workpiece which is constructed of a certain material, comprising a supporting structure, a head on the supporting structure and having spaced upper and lower portions constructed of material identical to the material of the workpiece, said head defining a tempering liquid-confining chamber between said upper and lower portions, means supplying tempering liquid to the chamber, a plurality of upright boring bar mounting spindles projecting through and rotatably mounted on the upper and lower portions of the head and also projecting through the chamber, the lower ends of the spindles being adapted for mounting boring bars thereon, mechanism on the supporting structure rotating the spindles on their respective axes, a workpiece-supporting table below the head, mechanism movably connecting the table with the head and producing relative movement of the table whereby to cause engagement between the boring bars and the workpiece, the lower portion of the head having flow openings therethrough and directing the tempering liquid onto the workpiece, whereby any effect of temperature changes is the same in the head and in the workpiece.

References Cited in the file of this patent

UNITED STATES PATENTS

| | | |
|---|---|---|
| 1,660,372 | Bockhoff | Feb. 28, 1928 |
| 1,948,507 | Carlson | Feb. 27, 1934 |
| 1,967,689 | Schauer et al. | July 24, 1934 |
| 2,080,643 | Walther | May 18, 1937 |
| 2,114,039 | Verderber et al. | Apr. 12, 1938 |
| 2,312,292 | Tyson | Feb. 23, 1943 |
| 2,378,618 | Burt | June 19, 1945 |
| 2,388,621 | Sirp et al. | Nov. 6, 1945 |
| 2,522,736 | Zagar | Sept. 19, 1950 |
| 2,723,405 | Woodward | Nov. 15, 1955 |